United States Patent Office 3,558,677
Patented Jan. 26, 1971

3,558,677
FLUORINATED AMIDE-VINYL SULFONE ADDUCTS
Richard F. Sweeney, Randolph Township, Morris County, and Alson K. Price, Morristown, N.J., assignors to Allied Chemical Corporation, New York, N.Y., a corporation of New York
No Drawing. Filed Aug. 1, 1968, Ser. No. 749,305
Int. Cl. C07c 143/90; C11d 1/28
U.S. Cl. 260—401                      15 Claims

ABSTRACT OF THE DISCLOSURE

Fluorinated amide-vinyl sulfone adducts, useful as oil- and water-repellency agents, have the structural formula $$R_f-\overset{O}{\overset{\|}{C}}-\overset{H}{\overset{|}{N}}-(C_xH_{2x}-\overset{Z'}{\overset{|}{N}})_y-C_xH_{2x}-\overset{H}{\overset{|}{N}}-Z$$

wherein $R_f$ is a fluorinated isoalkoxyalkyl radical; $x$ and $y$ are integers from 2 to 6 and 1 to 4, respectively; Z is H, an acyl radical $R_fCO$— wherein $R_f$ is as described above, or a vinyl sulfone radical; Z' is H, an acyl radical $R_fCO$— wherein $R_f$ is as described above, a vinyl sulfone radical or a radical having the formula —$C_xH_{2x}NHZ$ wherein $x$ and Z are as described above; there being at least one acyl radical $R_fCO$— and one vinyl sulfone radical in the molecule represented by Z and Z'.

BACKGROUND OF THE INVENTION

This invention relates to novel fluorocarbon derivatives. More particularly, this invention is concerned with fluorinated amide-vinyl sulfone adducts, valuable as oil- and water-repellency agents.

It is an object of the present invention to provide novel fluorocarbon compounds.

It is another object of the present invention to provide fluorinated amide-vinyl sulfone adducts having oil- and water-repellency properties.

It is yet another object to provide oil- and water-repellency compositions of novel fluorocarbon derivatives suitable for treating textile materials to impart thereto durable oleophobic and hydrophobic properties.

These and other objects are apparent from the following description.

DESCRIPTION OF THE INVENTION

The novel fluorinated amide-vinyl sulfone adducts of the present invention have the structural formula

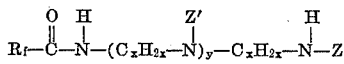

$$R_f-\overset{O}{\overset{\|}{C}}-\overset{H}{\overset{|}{N}}-(C_xH_{2x}N)_y-C_xH_{2x}-\overset{H}{\overset{|}{N}}-Z \quad (I)$$

wherein (1) $R_f$ is a radical having the formula

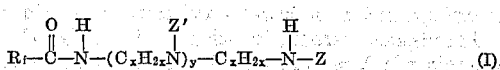

$$F-\overset{R_1}{\overset{|}{C}}-R_2$$
$$F-\overset{|}{C}-O-(CF_2)_r-(CF_2CF_2)_m-(CH_2CH_2)_n-(CX_2)_p$$
$$-F-\overset{|}{C}-R_2$$
$$\overset{|}{R_1} \quad (II)$$

wherein (a) $R_1$ and $R_2$ are fluorine or are fluoroalkyl groups, or, when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups, (b) $m$ and $n$ are integers of from 0 to 20, with the proviso that the sum of $m$ and $n$ is from 0 to 20, and provided further that when $r$ is 0, $m$ is at least 1, (c) X is selected from the group consisting of hydrogen and fluorine, with the proviso that when $n$ is greater than 0, then X is always hydrogen, (d) $p$ is 0 or 1, (e) $r$ is 0 or 1, with the proviso that when the sum of $m$, $n$ and $p$ is greater than 0, then $r$ is always 0, (2) $x$ is an integer from 2 to 6,
(3) $y$ is an integer from 1 to 4,
(4) Z is a member selected from the group consisting of
  (a) hydrogen,
  (b) an acyl radical having the formula $R_fCO$— wherein $R_f$ has the afore-stated meaning, and
  (c) a vinyl sulfone radical having the formula

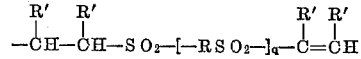

$$-\overset{R'}{\overset{|}{C}}H-\overset{R'}{\overset{|}{C}}H-SO_2-[-RSO_2-]_q-\overset{R'}{\overset{|}{C}}=\overset{R'}{\overset{|}{C}}H$$

in which
  (i) R is an alkylene, aryl or aralkyl radical,
  (ii) $q$ is 0 or 1,
  (iii) R' is hydrogen, an alkyl, an aryl or a substituted aryl radical, and
(5) Z' is a member selected from the group consisting of
  (a) hydrogen,
  (b) an acyl radical having the formula $R_fCO$— wherein $R_f$ has the afore-stated meaning,
  (c) a vinyl sulfone radical having the formula

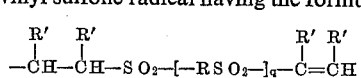

$$-\overset{R'}{\overset{|}{C}}H-\overset{R'}{\overset{|}{C}}H-SO_2-[-RSO_2-]_q-\overset{R'}{\overset{|}{C}}=\overset{R'}{\overset{|}{C}}H$$

in which R, R' and $q$ have the afore-stated meanings, and
  (d) a radical having the formula —$C_xH_{2x}NHZ$ in which $x$ and Z have the afore-stated meanings, with the proviso that at least one of Z and Z' is an acyl radical or Z' is a radical having the formula —$C_xH_{2x}NHZ$ wherein Z is an acyl radical, and at least one of Z and Z' is a vinyl sulfone radical or Z' is a radical having the formula —$C_xH_{2x}NHZ$ wherein Z is a vinyl sulfone radical, said acyl and vinyl sulfone radicals having the aforestated formulas.

In the above formulas, $R_f$ represents the same or a different fluoroisoalkoxyalkyl radical, above described. In the

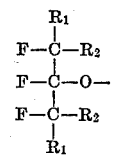

$$F-\overset{R_1}{\overset{|}{C}}-R_2$$
$$F-\overset{|}{C}-O-$$
$$F-\overset{|}{C}-R_2$$
$$\overset{|}{R_1}$$

moiety of the $R_f$ radical of the invention compounds represented by Formula I, above, $R_1$ and $R_2$ are preferably fluorine or perfluoroalkyl groups. When perfluoroalkyl groups, $R_1$ and $R_2$ preferably contain 1–2 carbon atoms. When the $R_1$ and $R_2$ groups contain hydrogen substitution, the atomic ratio of fluorine to hydrogen is at least 1:1.

In preferred embodiments integer $m$ in the $R_f$ radical of the compounds of Formula I, above, is at least 1, and the sum of $m$ and $n$ is preferably from 1 to 10. Specific examples of preferred embodiments of the preferred

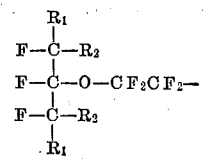

$$F-\overset{R_1}{\overset{|}{C}}-R_2$$
$$F-\overset{|}{C}-O-CF_2CF_2-$$
$$F-\overset{|}{C}-R_2$$
$$\overset{|}{R_1}$$

moiety of the $R_f$ radical of the compounds of the present invention include the following:

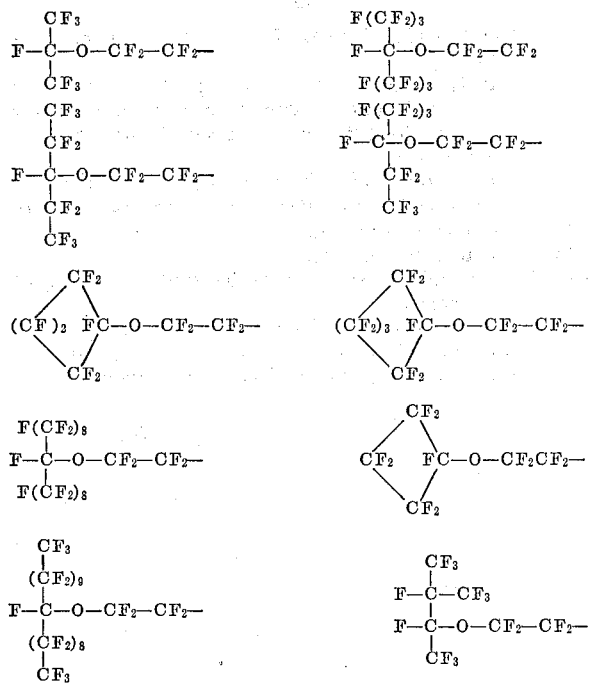

A radical having the formula $$(CF_3)_2CFO-(CF_2CF_2)_m-(CH_2CH_2)_n-(CX_2)_p-$$

wherein $m$ is an integer from 1 to 10, $n$ is an integer from 0 to 10, with the proviso that the sum of $m$ and $n$ is from 1 to 10, and wherein X and $p$ have the aforestated meanings is a specific preferred $R_f$ radical.

The alkylene ($C_xH_{2x}$) linkage in the compounds represented by Formula I, above, may be a straight-chain or branched-chain group, preferably containing from 2 to 4 carbon atoms. The R radical in the vinyl sulfone moiety of the invention compounds may be a straight-chain or branched-chain alkylene radical containing from 1 to 4 carbon atoms; an aryl radical such as phenyl or naphthyl; or an aralkyl radical such ar benzyl, phenethyl or xylyl. The R' radicals in the vinyl sulfone moiety may be alkyl containing from 1 to 6 carbon atoms including methyl, ethyl, propyl, hexyl as well as various isomeric forms thereof; or aryl such as phenyl, naphthyl and substituted derivatives thereof, including ortho- meta- or para-tolyl; ortho-, meta- or para-chlorophenyl and para-nitrophenyl.

Compounds corresponding to the general formula:

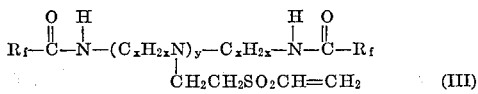

wherein $R_f$, $x$ and $y$ have the afore-stated meanings constitute preferred embodiments of the present invention.

As described in detail below, the novel compounds of the present invention are prepared by reacting a sulfone reactant with a fluorine-containing polyamide starting material.

The vinyl sulfone reactant employed in the preparation of the novel fluorocarbons of the present invention may be substituted or unsubstituted and, when substituted, has only one substituent on each vinyl group. Illustratively, the vinyl sulfone reactant is represented by the formula:

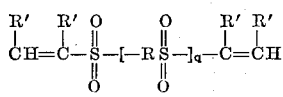

wherein R, R' and $q$ are as previously defined. Specific examples of vinyl sulfone reactants employable herein include divinyl sulfone; dipropenyl sulfone; di-isopropenyl sulfone; distyryl sulfone; bis(1-hexenyl) sulfone; bis-(alpha-ethylvinyl) sulfone; bis(alpha-n-butylvinyl) sulfone; bis(alpha-phenylvinyl) sulfone; 1,2-bis(vinylsulfonyl) ethane; 1,2-bis(styryl sulfonyl) ethane; 1,4-bis-(alpha-ethylvinyl sulfonyl) butane; and 1,4-bis(vinylsulfonyl) benzene and the like. If desired, the sulfone reactant may comprise a compound capable of forming a vinylsulfone in situ at reaction conditions at which the textile material is treated with the fluorocarbon derivatives of the invention. Typical compounds exhibiting these properties are the bis($\beta$-hydroxyethyl) sulfones, the lower alkanoic carboxylic acid esters thereof and compounds of the class described, for example in U.S.P. 3,000,762 of Sept. 19, 1961.

The fluorine-containing polyamide starting material suitable for reaction with the above sulfone compounds is characterized by the structural formula:

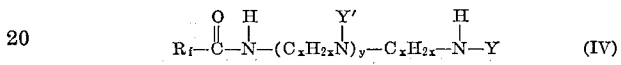

wherein $R_f$, $x$ and $y$ have the above-stated meanings, Y is a member selected from the group consisting of hydrogen and an acyl radical having the formula $R_fCO-$ in which $R_f$ has the afore-stated meaning and Y' is a member selected from the group consisting of hydrogen, an acyl radical having the formula $R_fCO-$ in which $R_f$ has the afore-stated meaning and a radical having the formula $C_xH_{2x}NHY$ in which $x$ and $y$ have the afore-stated meanings provided that at least one of Y and Y' is an acyl radical or Y' is a radical having the formula $-C_xH_{2x}NHY$ in which Y is an acyl radical, said acyl radical having the afore-stated formula and at least one of Y and Y' is hydrogen. The fluorine-containing polyamide reactant herein contemplated is prepared by reaction of a fluorinated carboxylic acid reactant with a polyalkylene polyamide corresponding to the formula:

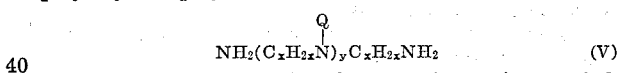

wherein $x$ and $y$ have the afore-stated meanings and Q is hydrogen or an aminoalkyl radical having the formula $-C_xH_{2x}NH_2$ in which $x$ has the afore-stated meaning.

The fluorinated carboxylic acid reactant comprises acids having the formula

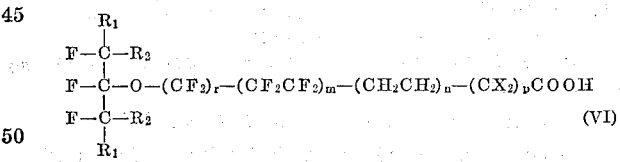

wherein $R_1$, $R_2$, X, $m$, $n$, $r$ and $p$ have the afore-stated meanings, and their lower alkyl esters and acid halides.

Fluorinated carboxylic acids of Formula VI, above, wherein $r$ is 0, $m$ is at least 1 and the sum of $n$ and $p$ is at least 1 can be prepared by various hereinafter described methods from telomers having the general formula

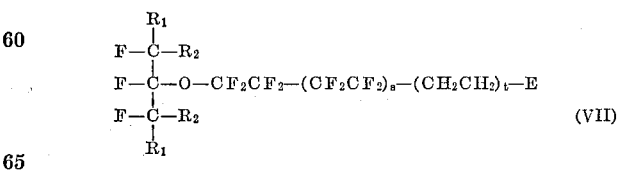

wherein $R_1$ and $R_2$ have the afore-stated meanings, wherein $s$ and $t$ are each integers from 0 to 20, the sum of $s$ and $t$ being at least 1, and wherein E is a halogen selected from the group consisting of Br and I. Telomers of that type and their preparation are described in commonly assigned copending application of Anello et al. entitled, "Telomers and Process for the Preparation Thereof," Ser. No. 633,359, filed Apr. 25, 1967, the pertinent subject matter of which is hereby incorporated by reference. By way of general description, these telomers are prepared by radical addition reactions of polyfluoroisoalkoxyalkyl halide telogens of the formula

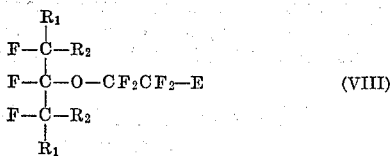

$$\begin{array}{c} R_1 \\ | \\ F-C-R_2 \\ | \\ F-C-O-CF_2CF_2-E \\ | \\ F-C-R_2 \\ | \\ R_1 \end{array} \quad \text{(VIII)}$$

wherein $R_1$, $R_2$ and E have the afore-stated meanings, with telomerizable unsaturated compounds. The telomerization reaction may be initiated by heat or by means of a free radical initiating catalyst. The polyfluoroisoalkoxyalkyl halide telogen starting materials may be prepared by reacting a corresponding halogenated ketone with an ionizable fluoride salt, e.g. CsF, to form a fluorinated organic salt and then reacting the organic salt with a halogen other than fluorine or chlorine and tetrafluoroethylene. Preparation of the telogen starting materials is described in detail in copending applications of Litt et al., "Fluorinated Ethers," U.S. Ser. Nos. 492,276 and 513,-574, filed Oct. 1, 1965, and Dec. 13, 1965 respectively, the pertinent subject matter of which applications is hereby incorporated by reference.

Fluorinated carboxylic acids of Formula VI, above, wherein $r$, $n$ and $p$ are all 0 and wherein $m$ is at least 2 may be prepared by reacting the corresponding telomer represented by general Formula VII, above, wherein $t$ is 0 with ICN or $(CN)_2$ to form the nitrile, followed by hydrolysis of the nitrile in known manner to form the free acid. The reaction between the telomer and the ICN or $(CN)_2$ to form the nitrile is carried out under superatmospheric pressure above about 20 to 200 atmospheres or more at temperatures in excess of about 300° C., preferably using an excess of the ICN or $(CN)_2$ reactant. Hydrolysis of the nitrile to form the free acid can be effected by treatment with aqueous mineral acid, such as hydrochloric, phosphoric, or sulfuric acid, at temperatures between about 60° C. and about 125° C.

Fluorinated carboxylic acids of Formula VI, above, wherein $m$ is at least 1, $r$ and $p$ are both 0 and $n$ is greater than 0 may be prepared by reacting the corresponding telomer represented by Formula VII, above, wherein $t$ is greater than 0 with an alkali metal cyanide to form the nitrile, followed by hydrolysis of the nitrile to form the free acid, as described above. The reaction between the telomer and the alkali metal cyanide is preferably carried out in aqueous alcoholic solution at temperatures between about 60° and about 100° C.

Fluorinated carboxylic acids of Formula VI, above, wherein $m$ is at least 1, $r$ is 0, $p$ is 1 and X is hydrogen can be prepared by reacting the corresponding telomer represented by general Formula VII, above wherein $t$ is at least 1 with $SO_3$ to form the corresponding pyrosulfate, or with oleum to form the corresponding hydrosulfate, hydrolysis of the pyrosulfate or the hydrosulfate with aqueous acid to form the corresponding alcohol, followed by oxidation of the alcohol with dichromate, permanganate or strong nitric acid to form the free acid.

Fluorinated carboxylic acids of Formula VI, above, wherein $m$ is at least 1, $r$ and $n$ are both 0, $p$ is 1 and X is fluorine can be prepared by reacting the corresponding telomer represented by Formula VIII, above, wherein $t$ is 0 with $SO_3$ to form corresponding acid halides and fluoropyrosulfates and hydrolyzing the acid halides and fluoropyrosulfates by refluxing with water to obtain the corresponding free acids. Fluorinated carboxylic acids of Formula VI, above, wherein $r$ is 1, and $m$, $n$, and $p$ are all 0 can be prepared by the same method from polyfluoroisoalkoxyalkyl halide compounds of Formula VIII, above.

Fluorinated carboxylic acids of Formula VI, above, wherein $m$ is 1 and $r$, $n$ and $p$ are all 0 can be prepared from polyfluoroisoalkoxyalkyl halide compounds of Formula VIII, above, by reacting them with a Grignard reagent to form a magnesium halide adduct, reacting this adduct with $CO_2$ to form a magnesium halide salt, and then acidifying the salt to obtain the desired acid. The reactions involving the Grignard reagent and the carbon dioxide proceed very rapidly and can be conducted at temperatures considerably below 0° C. Preparation of these acids is described in detail in commonly assigned co-pending application of Litt et al., "Fluorinated Ethers," U.S. Ser. No. 492,276, filed Oct. 1, 1965, referred to above.

The esters and acid halides of the above-described acids may be prepared from the acids by conventional procedures.

While the telomers of Formula VII, above, and the fluorinated carboxylic acid reactants derived therefrom, may be prepared as discrete compounds, they are generally obtained as mixtures of compounds of varying chain length. It is to be understood that both, the individual discrete fluorinated carboxylic acid reactants as well as their mixtures of compounds of varying chain length are suitable for reaction with polyalkylen polyamide compounds of Formula V, above. It is therefore intended that the appended claims cover compounds wherein the $R_f$— groups are derived from individual, discrete fluorinated carboxylic acid reactants as well as compounds wherein the $R_f$— groups are derived from mixtures of carboxylic acid reactants of varying chain length.

Preparation of above-described acids is described in more detail in commonly assigned copending applications of Anello et al., U.S. Ser. Nos. 721,115 and 721,117, both filed Apr. 12, 1968, respectively entitled "Fluorocarbon Acids and Derivatives" and "Fluorocarbon Compounds," the pertinent subject matter of which applications is hereby incorporated by reference.

The fluorine-containing polyamide reactant of Formula IV, above, may be prepared by simply mixing the fluorinated carboxylic acid reactant with the polyalkylene polyamine reactant of Formula V, above. These reactants may be charged in a molar proportion of 1 mol of polyalkylene polyamine reactant to about 1 to 7 mols of fluorinated carboxylic acid reactant. If desired, the reaction may be carried out in the presence of a suitable inert organic solvent. Suitable reaction temperatures range between about 0° C. to about 200° C. Upon conclusion of the reaction the fluorine-containing polyamide product may be recovered from the reaction mixture by conventional methods.

The reaction product, obtained as a result of the reaction of the fluorinated carboxylic acid and polyalkylene polyamine reactants above described, may comprise a single compound conforming to the above-stated structural formula, a mixture of isomers thereof or a reaction mass composed of amide products containing two or more amide functions. The resulting fluorine-containing polyamide is suitable without further purification for direct use as an intermediate in the preparation of the fluorocarbon derivatives of the present invention. However, if desired, the fluorine-containing polyamide may be further purified prior to reaction with the vinyl sulfone reactant, as by distillation or recrystallization using any commonly employed inert organic solvent such as acetonitrile or chloroform.

The novel fluorocarbon derivatives of this invention are prepared by heating a mixture of the sulfone reactant with the fluorine-containing polyamide starting material, above described. These reactants may be charged in a molar proportion of 1 mol of fluorine-containing polyamide to about 1 to 10, preferably about 2 to 4 mols of sulfone reactant. The reaction temperature and time are dependent upon the particular fluorine-containing polyamide and sulfone reactants involved. The temperature ranges from about 25° C. to 160° C., preferably about 40° C. to 90° C., and the time ranges from about ½ to 4 hours. If desired, the reaction may be conducted in the presence of an inert organic solvent and, when present, the maximum temperature employable is limited only by the reflux temperature of the mixture. Although the reaction may be effected at superatmospheric pressure, it is preferred to conduct the reaction at atmospheric pressure.

At the conclusion of the reaction, the reaction mixture is cooled to ambient conditions and treated with water to effect insolubilization of the fluorocarbon derivative of the present invention. When a discrete molecular species of fluorine-containing polyamide is subjected to reaction with the vinyl sulfone reactant, the desired product is generally obtained as a solid and may be recovered by conventional means, as by filtration. However, when mixtures of fluorine-containing polyamides are employed as a starting material in the process, the desired fluorocarbon derivative is generally obtained as a liquid and may be recovered as the distillant by distillation of the reaction mass.

The resulting solid or liquid fluorocarbon product of the reaction is suitable for direct application as an oil- and water- repellency agent without further purification. However, if desired, the fluorocarbon product may be further purified prior to treatment therewith of the textile material, as by distillation or recrystallization from any inert organic solvent such as carbon tetrachloride or acetonitrile.

The following examples relate to the preparation of representative compounds of the present invention but are not intended to be limiting on the scope thereof.

EXAMPLE 1

Solid 1,7-bis[perfluoro(7-oxa - 8-methylnonanoyl)]-1, 4,7-triazaheptane (5.0 g., 0.0049 mol) is dissolved in 35 ml. of dimethylformamide. To this solution are added 5.8 g. (0.049 mol) of divinyl sulfone and the reaction mixture is heated to 75° C. for a period of 4 hours under constant stirring. The reaction mixture is then cooled to room temperature and is diluted with 70 ml. of cold water to precipitate the crude product, which is collected, water-washed and dried on a suction filter, a 3.6 g. portion of crude product being obtained. The aqueous filtrate is extracted twice with 70 ml. portions of diethyl ether. Ethereal extracts are combined, washed twice with 70 ml. portions of cold water and are evaporated to dryness to yield an additional 0.3 g. portion of crude product. The combined solids (3.9 g., 70% yield) are recrystallized twice from acetonitrile to yield 2 g. of purified product, M.P. 94.5°–95.5° C., having the structural formula $$[(CF_3)_2CFO-(CF_2)_5-\overset{O}{\overset{\|}{C}}-\overset{H}{\overset{|}{N}}-C_2H_4]_2N-CH_2CH_2SO_2CH=CH_2.$$

Elemental analysis of the purified product compares with calculated values for $C_{26}H_{17}N_3O_6SF_{34}$ as follows:

Calculated (percent): C, 27.2; H, 1.49; N, 3.66; S, 2.8; F, 56.6. Analysis (percent): C, 27.6; H, 1.6; N, 4.7; S, 2.8; F, 56.3.

The 1,7-bis[perfluoro(7 - oxa - 8 - methylnonanoyl)]-1, 4,7-triazaheptane starting material is prepared as follows:

Under constant agitation and external cooling to maintain the reaction mixture between about 25°–30° C., 4.17 g. (0.0405 mol) of diethylene triamine are slowly added to 40 g. (0.0809 mol) of $(CF_3)_3CFO-(CF_2)_5COOCH_3$. After about ⅔ of the diethylene triamine is added the reaction mixture solidifies. Upon completion of the amine addition the reaction mixture is warmed to 75° C. (the mixture becomes liquid between about 35°–55° C.) and is maintained at that temperature for a period of 16 hours. After that 16 hour period the reaction mixture is allowed to cool to room temperature (about 25° C.), whereupon it solidifies. Repeated recrystallization of the mixture thus obtained from a 6/1 chloroform/ethanol mixture yields two solid product fractions: fraction (a), consisting of finely divided, soft white crystals, and fraction (b), a waxy yellow solid. Fraction (a) is separated and further recrystallized from a chloroform-ethanol mixture to yield 6.5 g. of white crystalline product which, after drying in vacuo has a M.P. of 34°–35° C. This product is the compound $$[(CF_3)_2CFO-(CF_2)_5-CONHCH_2CH_2]_2NH$$

EXAMPLE 2

Twenty grams of 1,9-bis[perfluoro(9-oxa-10-methylundecanoyl)]-1,5,9-triazanonane are dissolved in 75 ml. of dimethyl formamide under gentle heating. To this solution are added 5 ml. of divinyl sulfone and the reaction mixture is heated to 90° C. for a period of 3 hours. After that 3 hour period the reaction mixture is cooled to room temperature and 30 ml. of water are added in one portion to form aqueous and organic layers. The organic layer is extracted with 50 ml. portions of diethyl ether, etheral extracts are combined, water-washed, dried over anhydrous magnesium sulfate. The ether is removed by evaporation under reduced pressure to yield as crude product the compound 1,9-bis[perfluoro(7-oxa-8 - methylnonanoyl)]-5-(β-vinylsulfonylethyl - 1,5,9 - triazanonane having the following structural formula:

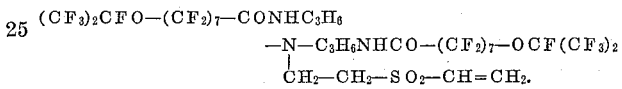

EXAMPLE 3

Eight grams of 1,10-bis[perfluoro(7-oxa-8-methylnonanoyl)]-1,4,7,10-tetraazadecane are dissolved in 30 ml. of dimethyl formamide under gentle heating. To this solution are added 5 ml. of divinyl sulfone and the mixture is heated to 90° C. for a period of 3 hours. The reaction mixture is then allowed to cool to about room temperature and a 25 ml. portion of cold water is added to precipitate the crude product, which is extracted with 30 ml. portions of diethyl ether. Ethereal extracts are combined, water-washed and dried over anhydrous magnesium sulfate. The ether is then removed by evaporation under reduced pressure to yield the crude product 1,10-bis[perfluoro(7 - oxa - 8 - methylnonanoyl)]-4,7-bis(β-vinylsulfonyl)-ethyl-1,4,7,10-tetraazadecane having the structural formula

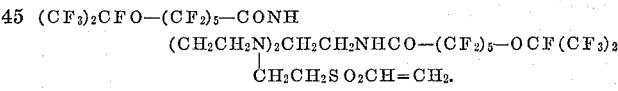

EXAMPLE 4

Following the procedure set forth in Example 1, 20 g. (.018 mol) of 1,7-bis[perfluoro(9-oxa-10-methylundecanoyl)]-1,4,7-triazaheptane are reacted with 5 g. (0.042 mol) of divinylsulfone in 75 ml. of dimethylformamide to provide 20.6 g. (83% yield) of crude 1,7-bis[perfluoro(9-oxa-10-methylundecanoyl)]-4-(2 - vinylsulfonylethyl)-1, 4,7-triazaheptane having the formula

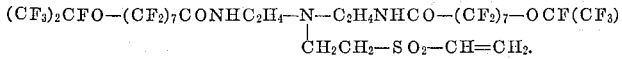

EXAMPLES 5–18

In a manner analogous to that described in the above examples, other compounds illustrative of the present invention are prepared as follows:

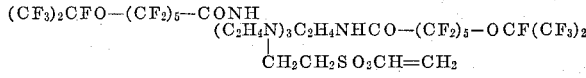

by reaction of 1,13-bis[perfluoro(7-oxa-8-methylnonanoyl)]1,4,7,10,13-pentaazatridecane with divinyl sulfone.

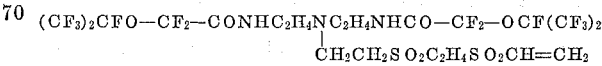

by reaction of 1,7 - bis[perfluoro(3 - oxa - 4 - methylpentanoyl)]-1,4,7-triazaheptane with 1,2 - bis(vinylsulfonyl)ethane.

$(CF_3)_2CFO—(CF_2)_2—(CH_2)_2$
        $—CONHC_2H_4NC_2H_4NHCO—(CH_2)—(CF_2)_2—OCF(CF_3)_2$
                         $|$
                         $C_2H_4SO_2CH=CH_2$ by reaction of 1,7-bis[2,2,3,3-tetrahydroperfluoro(6-oxa-7-methyloctanoyl)]-1,4,7-triazaheptane with divinyl sulfone.

$$\begin{array}{c} CF_2 \\ / \backslash \\ CF_2 \quad CFO—(CF_2)_9 \\ \backslash / \\ CF_2 \end{array}$$

$CF_2$
                                                              $/ \backslash$
        $—CONHC_2H_4NC_2H_4NHCO—(CF_2)_9—OCF \quad CF_2$
                    $|$                                     $\backslash /$
                    $C_2H_4SO_2CH=CH_2$                      $CF_2$ by reaction of 1,7-bis[perfluoro(11-oxa-11-cyclobutylundecanoyl)]-1,4,7-triazaheptane with divinyl sulfone.

$(CF_3)_2CFO—(CF_2)_{20}—(CH_2)_{21}—CONHC_2H_4$
        $—N—C_2H_4NHCO—(CH_2)_{20}—(CF_2)_{20}—OCF(CF_3)_2$
        $|$
        $C_2H_4SO_2CH=CH_2$ by reaction of 1,7-bis[22-perfluoro(21-oxa-22-methyltricosyl) docosanoyl]-1,4,7-triazaheptane with divinyl sulfone.

$(CF_3)_2CFO—(CF_2)_{10}—CH_2—CONHC_2H_4—N—C_2H_4NHCO—CH_2—(CF_2)_{10}—OCF(CF_3)_2$
                                                        $|$
                                                        $CH—CH_2SO_2C=CH$
                                                        $|$         $|$
                                                        $C_2H_5$    $C_2H_5$ by reaction of 1,7-bis[2,2-dihydroperfluoro(13-oxa-14-methylpentadecanoyl]1,4,7-triazaheptane with bis (β-ethylvinyl) sulfone.

$(C_2F_5)_2CFO—(CF_2)_{10}—(CH_2)_{10}—CONH(C_2H_4N)_2C_2H_4NHCO—(CH_2)_{10}—(CF_2)_{10}—OCF(C_2F_5)_2$
                                         $|$
                                         $CHCH_2SO_2CH=CH$
                                         (diphenyl group)

by reaction of 1,10-bis[11-perfluoro(11-oxa-12-ethyltetradecyl)-undecanoyl]-1,4,7,10-tetraazadecane with distyryl sulfone.

$CF_3$                                                $CF_3$
    $|$                                                   $|$
$F—C—O—(CF_2)_5CONH(C_2H_4N)_2C_2H_4NHCO(CF_2)_5—O—C—F$
    $|$                    $|$                           $|$
    $CF_3$                 $C_2H_4SO_2CH=CH_2$           $CF_3$ by reaction of 1,10-bis[perfluoro(7-oxa-8-methyl nonanoyl)]-1,4,7,10-tetraazadecane with divinyl sulfone.

$(CF_3)_2CFO—(CF_2)_4—CONH(C_2H_4N)_3C_2H_4NHCO—(CF_2)_4—OCF(CF_3)_2$
                            $|$
                            $CH_2CH_2SO_2—\langle C_6H_4 \rangle—SO_2CH=CH_2$ by reaction of 1,13-bis[perfluoro(6-oxa-7-methyloctanoyl)]-1,4,7,10,13-pentaazatridecane with 1,4-bis(vinylsulfonyl) benzene.

$CF_3$
    $|$
    $(CF_2)_9$
    $|$                                                   $(CF_2)_9$
$F—C—O—(CF_2)_2(CH_2)_2CONHC_2H_4—N—C_2H_4NHCO(CH_2)_2(CF_2)_2—O—C—F$
    $|$                            $|$                   $|$
    $CF_3$                         $C_2H_4SO_2CH=CH_2$   $CF_3$ by reaction of 1,7-bis[2,2,3,3-tetrahydroperfluoro(6-oxa-7-methylheptadecanoyl)]-1,4,7,-triazaheptane with divinyl sulfone.

$CF_2$                                                                      $CF_2$
   $/ \backslash$                                                             $/ \backslash$
$(CF_2)_2 \quad CFO—(CF_2)_5—CONH(C_2H_4N)_3C_2H_4NHCO—(CF_2)_5—OCF \quad (CF_2)_2$
   $\backslash /$                         $|$                                   $\backslash /$
    $CF_2$                                $C_2H_4SO_2CH=CH_2$                    $CF_2$ by reaction of 1,13-bis[perfluoro-7-oxa-7-cyclopentylheptanoyl)]-1,4,7,10,13-pentaazatridecane with divinyl sulfone.

$CHF_2$                                                    $CHF_2$
    $|$                                                        $|$
$F—C—O—(CF_2)_7—CONH(C_2H_4N)_2C_2H_4NHCO—(CF_2)_7—O—C—F$
    $|$                    $|$                                $|$
    $CF_3$                 $C_2H_4SO_2CH=CH_2$                $CF_3$ by reaction of 1,10-bis[perfluoro(9-oxa-10-hydromethylundecanoyl)]-1,4,7,10-tetraazadecane with divinyl sulfone.

$C_2H_4NH_2$
                            $|$
$(CF_3)_2CFO—(CF_2)_5CONHC_2H_4—N—C_2H_4—N—C_2H_4NHCO—(CF_2)_5—OCF(CF_3)_2$
                            $|$
                            $C_2H_4SO_2CH=CH_2$ by reaction of 1,10-bis[perfluoro(7-oxa-8-methylnonanoyl)]-4-(2-aminoethyl)-1,4,7,10-tetraazadecane with divinyl sulfone.

$(CF_3)_2CFOCF_2CONHC_2H_4$
                                        $C_2H_4NHCOCF_2OCF(CF_3)_2$
                                        $|$
    $—N—C_2H_4—N—C_2H_4NHCOCF_2OCF(CF_3)_2$
              $|$
              $C_2H_4SO_2CH=CH_2$ by reaction of 1,10-bis[perfluoro(3-oxa-4-methylpentanoyl)]-4-[2-perfluoro(3-oxa-4-methylpentanamido)ethyl]-1,4,7,10-tetraazadecane with divinyl sulfone.

$(CF_3)_2CFO—(CF_2)_5CONHC_2H_4$
                            $C_2H_4NHC_2H_4SO_2CH=CH_2$
                            $|$
    $—N—C_2H_4—N—C_2H_4NHCO(CF_2)_5OCF(CF_3)_2$
              $|$
              $C_2H_4SO_2CH=CH_2$ by reaction of 1,10-bis[perfluoro(7-oxa-8-methylnonanoyl)]-4-(2-aminoethyl)-1,4,7,10-tetraazadecane with divinyl sulfone.

The novel compounds of the present invention are useful in treating fibrous materials such as paper and textiles to make them repellent to water, oil and greasy stains. In addition, other materials such as the surfaces of wood, plastics, glass and metal may be treated with solutions, dispersions or emulsions containing the novel compounds of the present invention to make them water-, oil- and stain-repellent.

The fluorocarbon compounds of the present invention may be applied to the article by treating the same with a composition comprising the fluorocarbon compound together with a liquid carrier, as e.g. in form of a solution, dispersion or emulsion of the fluorocarbon compound, and then evaporating the carrier. If desired, the treated article may then be cured at elevated temperature. The concentration of the fluorocarbon compound on the treated article generally may vary from about 0.5% to about 10%, preferably about 1% to about 5%, based on the weight of the article.

When cellulosic materials are to be rendered oil- and water-repellent, the fluorocarbon compounds of the present invention are preferably applied thereto from an aqueous solution or an aqueous emulsion and in the presence of a basic catalyst. Phosphates, carbonates and hydroxides of alkali metals; alkaline earth metal hydroxides; and quarternary ammonium hydroxides such as tetraethyl ammonium hydroxide and benzyl trimethyl ammonium hydroxide are illustrative of suitable basic catalysts. In an illustrative process the cellulosic material is moistened with an aqueous solution of the catalyst, impregnated with an aqueous dispersion or emulsion of the fluorocarbon compound, and is then cured at elevated temperature, say between 100° to 165° C. Excess catalyst is then removed by washing with water and the cellulosic material thus chemically modified is dried. Various modifications of the above-described treatment may be employed.

The result of a test relating to use of a typical fluorinated amide-vinyl sulfone adduct of the present invention as oil-repellency agent is shown below.

The procedure employed in determining the oil-repellency rating on textiles is described, for example, on pages 323–324 of the April 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for three minutes. After the three minute time period the wetting and penetration of the fabric is visually observed. The number corresponding to the highest percentage of heptane which does not penetrate or wet the fabric is considered to be the oil-repellency rating of the treated fabric.

A one inch square piece of 80 x 80 count cotton print cloth was impregnated by total immersion for 5 minutes in a 3.3% solution of 1,7-bis[perfluoro(7-oxa-8-methylnonanoyl)] - 4 - (2 - vinylsulfonylethyl) - 1,4,7-triazaheptane. The cloth was then wrung out, and was air-dried. Oil-repellency was determined by the above-described method. The cloth had an oil-repellency rating of 130, indicating excellent oil-repellency.

Drops of water placed on the fabric so treated do not wet or penetrate the fabric, but can be easily removed, as by shaking the fabric. Thus, the treated fabric also is water-repellent.

When other compounds within the purview of the present invention are applied to fabrics as described above, similar results are obtained, that is to say the fabrics so treated exhibit oil- and water-repellent properties.

The compounds of the present invention have the advantage of providing durable oil- and stain-repellency properties to fabrics treated therewith, that is to say that fabrics, particularly cellulosic fabrics treated with the invention compounds maintain oil- and water-repellent properties even after repeated dry cleanings and/or launderings.

Various changes and modifications may be made in the invention without departing from its spirit or essential characteristics. It is therefore intended that all matter contained in the above described shall be interpreted as illustrative and not in a limiting sense.

We claim:

1. Compounds having the structural formula $$R_f-\overset{O}{\overset{\|}{C}}-N-(C_xH_{2x}-N)_y-C_xH_{2x}-N-Z$$
$$\phantom{R_f-\overset{O}{\overset{\|}{C}}-N-(C_xH_{2x}-N)_y-}\overset{Z'}{|}\phantom{-C_xH_{2x}-N-Z}$$

wherein
(1) $R_f$ is a radical having the formula

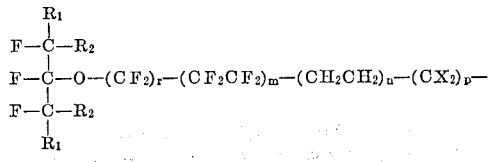

wherein
(a) $R_1$ and $R_2$ are fluorine or are fluoroalkyl groups, or, when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups,
(b) $m$ and $n$ are each integers of from 0 to 20, with the proviso that the sum of $m$ and $n$ is from 0 to 20, and provided further that when $r$ is 0, $m$ is at least 1,
(c) X is selected from the group consisting of hydrogen and fluorine, with the proviso that when $n$ is greater than 0, then X is always hydrogen,
(d) $p$ is 0 or 1,
(e) $r$ is 0 or 1, with the proviso that when the sum of $m$, $n$ and $p$ is greater than 0, then $r$ is always 0,
(2) $x$ is an integer from 2 to 6,
(3) $y$ is an integer from 1 to 4,
(4) Z is a member selected from the group consisting of
(a) hydrogen,
(b) an acyl radical having the formula $R_fCO-$ wherein $R_f$ has the afore-stated meaning, and
(c) a vinyl sulfone radical having the formula

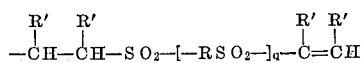

in which
(i) R is an alkylene, aryl or aralkyl radical,
(ii) $q$ is 0 or 1,
(iii) R' is hydrogen, an alkyl, an aryl or a substituted aryl radical, and
(5) Z' is a member selected from the group consisting of
(a) hydrogen,
(b) an acyl radical having the formula $R_fCO-$ wherein $R_f$ has the afore-stated meaning,
(c) a vinyl sulfone radical having the formula

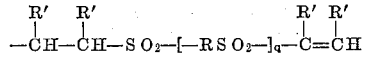

in which R, R' and $q$ have the afore-stated meanings, and
(d) a radical having the formula $-C_xH_{2x}NHZ$ in which $x$ and Z have the afore-stated meanings, with the proviso that at least one of Z and Z' is an acyl radical or Z' is a radical having the formula $-C_xH_{2x}NHZ$ wherein Z is an acyl radical, and at least one of Z and Z' is a vinyl sulfone radical or Z' is a radical having the formula $-C_xH_{2x}NHZ$ wherein Z is a vinyl sulfone radical, said acyl and vinyl sulfone radicals having the afore-stated formulas.

2. Compounds according to claim 1 wherein the $R_f$ radical has the formula $(CF_3)_2CFO-(CF_2CF_2)_m-(CH_2CH_2)_n-(CX_2)_p-$ wherein X and $p$ have the meanings given in claim 1, wherein $m$ is an integer from 1 to 10 and $n$ is an integer from 0 to 10, with the proviso that the sum of $m$ and $n$ is from 1 to 10.

3. Compounds according to claim 1 having the structural formula

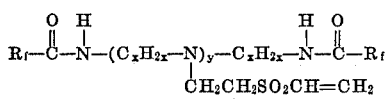

wherein $R_f$, $x$ and $y$ have the meanings given in claim 1.

4. Compounds according to claim 1 having the structural formula

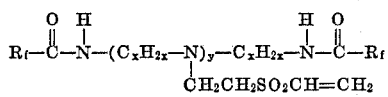

wherein $x$ and $y$ have the meanings given in claim 1 and wherein the $R_f$ radical has the formula stated in claim 1 wherein $R_1$ and $R_2$ are fluorine or are perfluoroalkyl groups containing from 1 to 2 carbon atoms.

5. Compounds according to claim 4 wherein integer $m$ in the $R_f$ radical is at least 1, and the sum of integer $m$ and integer $n$ is from 1 to 10.

6. Compounds according to claim 1 having the structural formula

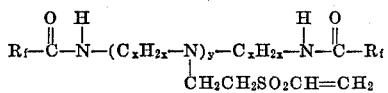

wherein $x$ and $y$ have the meanings given in claim 1 and wherein $R_f$ has the structural formula

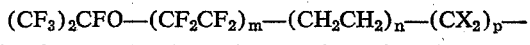

wherein X and $p$ have the meanings given in claim 1, wherein $m$ is an integer from 1 to 10 and $n$ is an integer from 0 to 10, with the proviso that the sum of $m$ and $n$ is from 1 to 10.

7. Compounds according to claim 6 wherein $x$ is an integer from 2 to 4.

8. A compound according to claim 7 having the structural formula $$[(CF_3)_2CFO-(CF_2)_5CONHC_2H_4]_2$$
$$N-CH_2CH_2SO_2CH=CH_2$$

9. A compound according to claim 7 having the structural formula $$[(CF_3)_2CFO-(CF_2)_7CONHC_3H_6]_2$$
$$N-CH_2CH_2SO_2CH=CH_2$$

10. A compound acording to claim 7 having the structural formula

11. A compound according to claim 7 having the structural formula

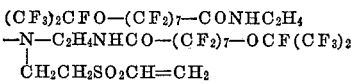

12. A compound according to claim 7 having the structural formula

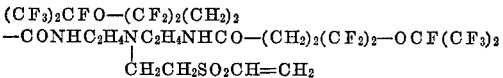
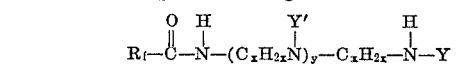

13. A process for preparing compounds according to claim 1 which comprises reacting a fluorine-containing polyamide compound having the formula

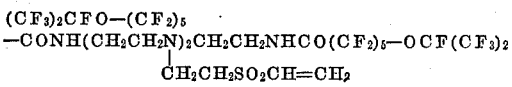

wherein $R_f$, $x$ and $y$ have the meanings given in claim 1, Y is a member selected from the group consisting of hydrogen and an acyl radical having the formula $R_fCO—$ wherein $R_f$ has the afore-stated meaning and Y' is a member selected from the group consisting of hydrogen, an acyl radical having the formula $R_fCO—$ wherein $R_f$ has the afore-stated meaning and a radical having the formula $—C_xH_{2x}NHZ$ wherein $x$ and Z have the afore-stated meanings, provided that at least one of Y and Y' is an acyl radical or Y' is a radical having the formula $—C_xH_{2x}NHY$ wherein Y is an acyl radical, said acyl radical having the afore-stated meaning, and at least one of Y and Y' is hydrogen, with a vinyl sulfone compound represented by the formula

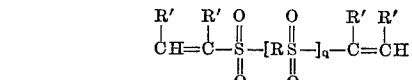

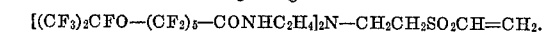

wherein R, R' and $q$ have the meanings given in claim 1,

14. A textile treated with a compound according to claim 1.

15. A textile treated with a compound according to claim 1 having the structural formula

References Cited
UNITED STATES PATENTS 2,727,004  12/1955  Cohen _____ 260—401
3,137,713  6/1964  Shen et al. _____ 260—400

ELBERT L. ROBERTS, Primary Examiner

U.S. Cl. X.R.
117—121; 252—8.7

UNITED STATES PATENT OFFICE
CERTIFICATE OF CORRECTION

Patent No. 3,558,677          Dated January 26, 1971

Inventor(s) Richard F. Sweeney and Alson K. Price

It is certified that error appears in the above-identified patent and that said Letters Patent are hereby corrected as shown below:

Column 3, line 16 formula on left of column

"  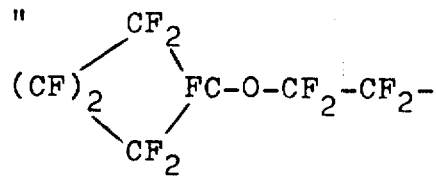  "          should be

--  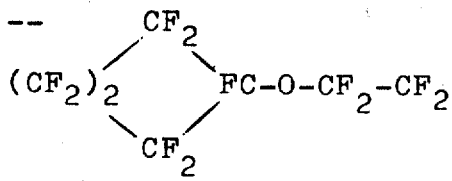  --.

Column 3, line 29 formula on left of column

"  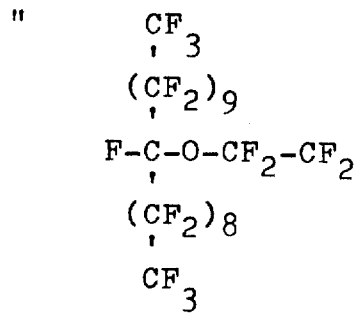  "          should be

-cont. next page-

UNITED STATES PATENT OFFICE
CERTIFICATE OF CORRECTION

Patent No. 3,558,677    Dated January 26, 1971

Inventor(s) Richard F. Sweeney and Alson K. Price

It is certified that error appears in the above-identified patent and that said Letters Patent are hereby corrected as shown below:

-2-

$$-- \quad \begin{array}{c} CF_3 \\ | \\ (CF_2)_9 \\ | \\ F-C-O-CF_2-CF_2 \\ | \\ (CF_2)_9 \\ | \\ CF_3 \end{array} \quad --.$$

Column 6, line 21, "polyalkylen" should be --polyalkylene--.

Column 8, line 57,

"$(CF_3)_2CFO-(CF_2)_7CONHC_2H_4-N-C_2H_4NHCO-(CF_2)_7-OCF(CF_3)$" should

--$(CF_3)_2CFO-(CF_2)_7CONHC_2H_4-N-C_2H_4NHCO-(CF_2)_7-OCF(CF_3)_2$--.

Column 9, line 26

"$-N-C_2H_4NHCO-(CH_2)_{20}-(CF_2)_{20}-OCF(CF_3)_2$" should be

-- $-N-C_2H_4NHCO-(CH_2)_{21}-(CF_2)_{20}-OCF(CF_3)_2$ --.

-cont. next page-

UNITED STATES PATENT OFFICE
CERTIFICATE OF CORRECTION

Patent No. 3,558,677    Dated January 26, 1971

Inventor(s) Richard F. Sweeney and Alson K. Price

It is certified that error appears in the above-identified patent and that said Letters Patent are hereby corrected as shown below:

-3-

Column 11, line 67, "described" should be --description--.

Claim 13, column 14, line 36 should be deleted.

Signed and sealed this 3rd day of August 1971.

(SEAL)
Attest:

EDWARD M. FLETCHER, JR.
Attesting Officer

WILLIAM E. SCHUYLER, JR.
Commissioner of Patents